(12) United States Patent
Joseph et al.

(10) Patent No.: US 11,134,004 B2
(45) Date of Patent: Sep. 28, 2021

(54) ENHANCED FLEXIBLE-ALGORITHM DEFINITION

(71) Applicant: Juniper Networks, Inc., Sunnyvale, CA (US)

(72) Inventors: William Britto Arimboor Joseph, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/396,196

(22) Filed: Apr. 26, 2019

(65) Prior Publication Data

US 2020/0344151 A1 Oct. 29, 2020

(51) Int. Cl.
| | |
|---|---|
| *H04L 12/701* | (2013.01) |
| *H04L 12/735* | (2013.01) |
| *H04L 12/751* | (2013.01) |
| *H04L 12/723* | (2013.01) |
| *H04L 12/749* | (2013.01) |

(52) U.S. Cl.
CPC .......... *H04L 45/1287* (2013.01); *H04L 45/02* (2013.01); *H04L 45/507* (2013.01); *H04L 45/741* (2013.01)

(58) Field of Classification Search
None
See application file for complete search history.

(56) References Cited

U.S. PATENT DOCUMENTS

| | | |
|---|---|---|
| 9,516,118 B2 | 12/2016 | Kini et al. |
| 9,559,954 B2 * | 1/2017 | Filsfils ................... H04L 45/02 |
| 2014/0254596 A1 | 9/2014 | Filsfils et al. |

OTHER PUBLICATIONS

Filsfils et al., "Segment Routing Architecture," Network Working Group, draft-filsfills-rtgwg-segment-routing-00, Jun. 28, 2013, 28 pp.
Filsfils et al., "Segment Routing Architecture," Network Working Group, draft-filsfils-spring-segment-routing-04, Jul. 3, 2014, 18 pp.
Filsfils et al., "Segment Routing Use Cases," Network Working Group, draft-filsfills-rtgwg-segment-routing-use-cases-01, Jul. 14, 2013, 46 pp.

(Continued)

*Primary Examiner* — Willie J Daniel, Jr.
(74) *Attorney, Agent, or Firm* — Shumaker & Sieffert, P.A.

(57) ABSTRACT

Techniques are described for advertising constraint-based path computation (e.g., flexible-algorithm) through a constrained network topology. For example, a network device comprises a memory and one or more programmable processors operably coupled to the memory, wherein the one or more programmable processors are configured to generate a packet including a segment identifier (SID) offset, wherein the SID offset is an offset value associated with the flexible-algorithm. The one or more programmable processors of the network device are also configured to send, to at least one other network device of the plurality of network devices, the SID offset to enable the at least one other network device to derive a node segment identifier for the at least one other network device to participate in the flexible-algorithm.

19 Claims, 4 Drawing Sheets

(56) References Cited

OTHER PUBLICATIONS

Filsfils et al., "Segment Routing with MPLS Data Plane," Network Working Group, draft-filsfils-spring-segment-routing-mpls-03, Jul. 31, 2014, 14 pp.

Previdi et al., "Source Packet Routing in Networking (SPRING) Problem Statement and Requirements," RFC 7855, Internet Engineering Task Force (IETF), May 2016, 19 pp.

Previdi et al., "IS-IS Traffic Engineering (TE) Metric Extensions" RFC 7810, Internet Engineering Task Force (IETF), May 2016, 18 pp.

Psenak et al. "IGP Flexible Algorithm" Network Working Group, draft-ieff-lsr-flex-algo-00.txt, May 15, 2018, 23 pp.

Lindem et al. "Extensions to OSPF for Advertising Optional Router Capabilities" RFC 7770, Internet Engineering Task Force (IETF), Feb. 2016, 15 pp.

Ginsberg et al. "IS-IS Extensions for Advertising Router Information" RFC 7981, Internet Engineering Task Force (IETF), Oct. 2016, 10 pp.

Moy "OSPF Version 2" RFC 2328, Network Working Group, Apr. 1998, 244 pp.

Coltun et al. "OSPF for IPv6" Network Working Group, RFC 5340, Jul. 2008, 94 pp.

Sheth et al. "OSPF Hybrid Broadcast and Point-to-Multipoint Interface Type" Internet Engineering Task Force (IETF), RFC 6845, Jan. 2013, 9 pp.

Lindem et al. "OSPFv3 LSA Extendibility" draft-acee-ospfv3-lsa-extend.01.txt, IETF Trust, Network Working Group, Jul. 15, 2013, 27 pp.

Oran, David, "OSI ISIS Intradomain Routing Protocol" Network Working Group, RFC 1142, Feb. 1990, 157 pp.

Li et al. "IGP Requirements for Traffic Engineering with MPLS" draft-li-mpls-igp-te-00.txt, Network Working Group, Internet Draft, Feb. 1999, 6 pp.

Extended Search Report from counterpart European Application No. 19181603.2, dated Nov. 21, 2019, 9 pp.

Response to Extended Search Report dated Nov. 21, 2019 from counterpart European Application No. 19181603.2, filed Apr. 22, 2021, 12 pages.

Examination Report from counterpart European Application No. 19181603.2, dated Jul. 5, 2021, 6 pp.

\* cited by examiner

ENHANCED FLEXIBLE-ALGORITHM DEFINITION

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

In some examples, routers may employ segment routing techniques, such as by using a Source Packet Routing in Networking (SPRING) protocol, that provide segment routing within an IGP domain to advertise single or multi-hop LSPs. SPRING includes multiple different segment identifier types including "adjacency" segment identifiers and "node" segment identifiers. To forward a packet through the network, the routers may steer the packet based on a list of segment identifiers (referred to as a "segment list") that is applied to the packet as it is forwarded through the network.

Routers that support segment routing techniques may also support constraint-based path computation in which path computations is performed based on various constraints, such as to configure a path on a particular plane of a network deployed with multiple planes. One example of path computation is so called "flexible-algorithm techniques" in which the router performs path computation based on flexible-algorithm associated with a defined calculation-type, metric-type, and a set of constraints. For example, calculation-type may include Shortest Path First or other calculation of a path. The metric-type may include the type of metric used to compute the best paths along the constrained topology. The set of constraints may restrict paths to links with specific affinities or avoid links with specific affinities. Routers that implement flexible algorithm techniques may steer traffic along the constraint-based segment routing paths. The flexible-algorithm used to compute the paths can be communicated between routers using IGP extensions.

SUMMARY

In general, techniques are described for advertising constraint-based path computation (e.g., flexible-algorithm) through a constrained network topology. For example, a network device, e.g., router, may advertise a flexible-algorithm definition that identifies the combination of a calculation-type, metric-type, and a set of constraints. The router device may also advertise an identifier for a flexible-algorithm that the network device is to participate in. The router may also advertise an offset value that receiving routers participating in the flexible-algorithm may use to derive a node segment identifier for the flexible-algorithm. That is, a router may simply advertise the single offset value rather than advertising a pre-computed node segment identifier for each flexible-algorithm the router is participating in. All routers participating in the flexible-algorithm derives a node segment identifier for that flexible-algorithm from the flexible-algorithm definition.

As one instance, routers may use segment routing techniques, e.g., Source Packet Routing in Networking (SPRING) protocol, for establishing an LSP. The routers may further support flexible-algorithm for segment routing. To participate in a particular flexible-algorithm, a default segment identifier (SID) (otherwise referred to herein as "default prefix SID") of each router participating in the flexible-algorithm may be offset with a value associated with the flexible-algorithm. The routers that are offset by the same value may participate in the flexible-algorithm.

As one example, a router participating in a flexible-algorithm may advertise to other routers a routing packet that includes a segment identifier offset ("SID offset") that indicates an offset value that other routers participating in the flexible-algorithm may use to derive a node segment identifier ("node SID") for the flexible-algorithm. That is, each router that is to participate in the flexible-algorithm may receive a routing packet including a SID offset and may use the SID offset to generate a node SID for use by the router to participate in the flexible-algorithm. In this way, an ingress router for a particular flexible-algorithm may generate a segment list of the generated node SIDs (e.g., the node SIDs that have been offset) such that routers may steer the packet along the constrained path based on a segment list that is applied to the packet as it is forwarded through the network The techniques of this disclosure may provide one or more technical advantages. For example, by advertising a SID offset associated with a flexible-algorithm instead of advertising a node SID for each flexible-algorithm that the router participates in, the configuration required for the router to participate in a flexible-algorithm may be simplified. For example, a user can configure which routers are to participate in a specific flexible-algorithm without generating the node SIDs that the routers use to participate in the flexible-algorithm. The routers instead advertise participation in the flexible-algorithm and may derive the node SID based on the SID offset that is advertised in a flexible-algorithm definition, thereby reducing the amount of manual configuration required on routers participating in the flexible-algorithm, which reduces the administrative overhead. Moreover, advertising the SID offset may avoid misconfiguration of node SIDs for the flexible-algorithm. For example, when users manually configure node SIDs for the flexible-algorithm, the node SIDs may be misconfigured, which may lead to conflicts among the misconfigured node SIDs. By advertising a SID offset, routers configured to participate in the flexible-algorithm may receive the SID offset and derive the node SID for the router to participate in the flexible-algorithm, thereby reducing the occurrence of misconfigured node SIDs. Moreover, by advertising a SID offset, each node is no longer required to generate a prefix SID for each flexible-algorithm that it is participating in.

In one example of the techniques disclosed herein, a method includes generating, by a network device of a plurality of network devices enabled for flexible-algorithm, a packet including a segment identifier (SID) offset, wherein the SID offset is an offset value associated with the flexible-algorithm. The method also includes sending, by the network device and to at least one other network device of the plurality of network devices, the SID offset to enable the at least one other network device to derive a node segment identifier for the at least one other network device to participate in the flexible-algorithm.

In another example of the techniques disclosed herein, a method includes receiving, by a network device of a plurality of network devices enabled for a flexible-algorithm, a packet including a segment identifier (SID) offset for the flexible-algorithm. The method also includes determining, by the network device, whether the network device is configured to participate in the flexible-algorithm. The method further includes generating, by the network device, a node segment identifier that enables the network device to participate in the flexible-algorithm.

In another example of the techniques disclosed herein, a network device of a plurality of network devices enabled for a flexible-algorithm path computation includes a memory; one or more programmable processors operably coupled to the memory, wherein the one or more programmable processors are configured to: generate a packet including a segment identifier (SID) offset, wherein the SID offset is an offset value associated with the flexible-algorithm. The one or more programmable processors are further configured to send, to at least one other network device of the plurality of network devices, the SID offset to enable the at least one other network device to derive a node segment identifier for the at least one other network device to participate in the flexible-algorithm.

The details of one or more examples are set forth in the accompanying drawings and the description below. Other features, objects, and advantages will be apparent from the description and drawings, and from the claims.

DETAILED DESCRIPTION

Figure 1:
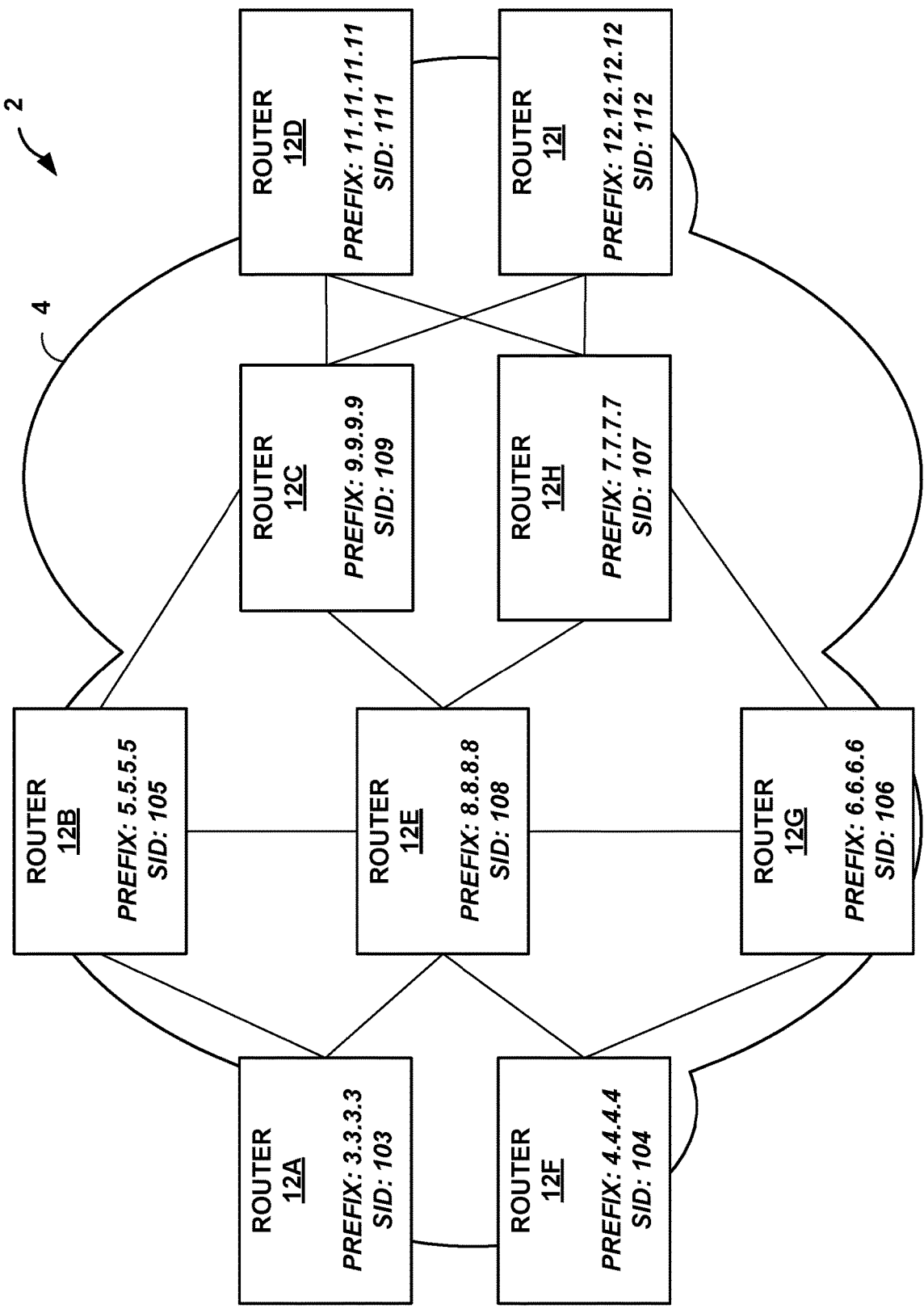
FIG. 1 is a block diagram illustrating an example system for advertising an offset value that network devices participating in a flexible-algorithm may each use to compute a node segment identifier for the flexible-algorithm, in accordance with techniques described herein.

FIG. 1 is a block diagram illustrating an example system 2 that includes a computer network 4 for advertising an offset value that network devices participating in a flexible-algorithm may each use to compute a node segment identifier for the flexible-algorithm, in accordance with techniques described in this disclosure. Network 4 may include network devices, e.g., PE routers 12A-12I ("routers 12"), to establish one or more label switched paths ("LSPs") that define distinct paths through network 4 to carry packets from a source PE router (e.g., ingress routers 12A or 12F) to a destination PE router (e.g., egress routers 12D or 12I).

The sources of the network traffic received by ingress router 12A or router 12F may comprise one or more devices (not shown) and/or any public or private network or the Internet that provides traffic to ingress routers 12A or 12F in network 4. The destinations of the network traffic being forwarded on LSPs may comprise one or more destination devices and/or network that may include LANs or wide area networks (WANs) that comprise a plurality of devices reachable by egress routers 12D or 12I. Destination devices may include personal computers, laptops, workstations, personal digital assistants (PDAs), wireless devices, network-ready appliances, file servers, print servers or other devices that access the source via network 4.

In the example of FIG. 1, routers 12 may use segment routing techniques, e.g., Source Packet Routing in Networking (SPRING) protocol, for establishing an LSP. For example, segment routing techniques are used to configure segment identifiers for paths from ingress router 12A to egress router 12D or from ingress router 12F to egress router 12I. Segment routing within an IGP domain (e.g., network 4) allows routers to advertise single or multi-hop LSPs within the IGP domain such as a segment routing LSP. For segment routing, the "path" information is disseminated between the routers as part of the IGP link state information for the domain. Routers are able to steer packets through a controlled set of instructions, called segments, by prepending a segment routing header (e.g., segment identifier (SID)) to the packets. Segment routing allows routers to enforce a flow through any topological path and service chain while maintaining per-flow state only at the ingress node to the segment routing domain.

One potential advantage of segment routing may be that the segment routing architecture can be directly applied to the Multi-Protocol Label Switching (MPLS) data plane with no change in the forwarding plane. A network administrator need only allocate one node segment per router and the segment routing Interior Gateway Protocol (IGP) control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 2016; and (3) "Segment Routing with MPLS data plane," IETF draft: draft-filsfils-spring-segment-routing-mpls-03, Jul. 31, 2014, the entire contents of each of which are incorporated by reference herein.

In the example of FIG. 1, routers 12 that are included in a segment routing domain may exchange segment identifiers in accordance with the SPRING protocol. Routers 12 operate as label switching routers (LSRs) that distribute segment identifiers to neighboring LSRs within network 4 to support SPRING forwarding along routed paths within network 4. As further described below, SPRING includes multiple different segment identifier types including "adjacency" segment identifiers and "node" segment identifiers. To forward a packet through network 4, routers that are SPRING enabled may steer traffic based on the segment identifiers in a segment list that is applied to the packet as it is forwarded through network 4. The segment list may encode the topological and service source route of the packet.

An adjacency segment identifier (SID) may have a local semantic to a particular segment routing node, such as one of routers 12. In particular, an adjacency SID steers traffic onto an adjacency (e.g., communication link and/or interface) or set of adjacencies. Thus, an adjacency SID may be related to a particular router. To use an adjacency SID, a router may initially assign the adjacency SID to a particular adjacency and advertise the adjacency SID to other routers in the segment routing domain using Intermediate System—Intermediate System (ISIS) protocol or the Open Shortest Path First (OSPF) protocol. The router may be the only router in the segment routing domain to use the particular adjacency SID. When a router forwards a packet using the adjacency SID, the router may cause the packet to use the adjacency for the router associated with the adjacency SID. In this way, adjacency SIDs may be used to establish one-hop tunnels within network 4.

A node SID, by contrast, may have a global semantic within a segment routing domain. That is, each of routers 12 that are SPRING enabled may be assigned a defined node SID range (commonly referred to as Segment Routing Global Block (SRGB)) that is unique to each respective router within the segment routing domain. An operator of network 4 may ensure unique allocation of the different node SID ranges from a global range to different routers. In addition to a node SID range, each particular router may also have a specific node SID that uniquely identifies the particular router in the segment routing domain. Each respective router may advertise its respective node SID and node SID range to other routers in the segment routing domain using ISIS or OSPF. For examples described in this disclosure, each of routers 12 may advertise a node SID added to the starting SID of the SRGB.

The segment identifiers (e.g., node SIDs and adjacency SIDs) are combined as an ordered list to perform traffic engineering. That is, an ingress router, e.g., router 12A, may steer a packet through a specific set of routers and links in the network without relying on the intermediate routers in the network to determine the actual path that the packet should take. Each of routers 12 may receive the ordered list of segment identifiers and steer the packet based on the segment identifiers.

In some examples, routers 12 may further support constraint-based path computation (e.g., flexible-algorithm) for segment routing. A type of constraint may be to compute a path along a subset of routers of a particular plane, or extended metrics as described in "IS-IS Traffic Engineering (TE) Metric Extensions," Internet Engineering Task Force (IETF), Request for Comments 7810, May 2016, the entire contents of which is incorporated by reference herein. Constraints may restrict paths to links with specific affinities, avoid links with specific affinities, or some combination of the two. As long as all routers in the domain have a common understanding as to what a particular flexible-algorithm represents, the resulting routing computation is consistent and traffic is not subject to any looping. For ease of illustration, the constraint of FIG. 1 will be described with respect to computing a path along a subset of routers of a particular plane.

In the example of FIG. 1, routers 12A, 12B, 12C, 12D, and 12E may be configured to participate in a first plane of network 4 (e.g., a first flexible-algorithm) and/or routers 12E, 12F, 12G, 12H, and 12I may be configured to participate in a second plane of network 4 (e.g., a second flexible-algorithm). That is, routers 12 may implement flexible-algorithm techniques to steer traffic along a constraint-based segment routing path, such as a path along a particular plane of network 4.

In the example of FIG. 1, routers 12A-12D are configured to participate in a first flexible-algorithm corresponding to a first plane of network 4, routers 12F-12I are configured to participate in a second flexible-algorithm corresponding to a second plane of network 4, and router 12E is configured to participate in both the first flexible-algorithm and the second flexible-algorithm.

Each router that participates in a particular flexible-algorithm may be configured with a node SID for a default segment route (e.g., segment route without flexible-algorithm or a flexible-algorithm identifier of 0), referred to as a "default node SID." In some instances, a default node SID is offset by a specific value (referred to herein as "segment identifier offset" or "SID offset") associated with the particular flexible-algorithm. For example, router 12A may be configured with a default node SID of 103 for a default segment route (e.g., flexible-algorithm identifier of 0). To participate in the first flexible-algorithm, the node SID for the default segment route is offset by a value (referred to herein as "segment identifier (SID) offset"), e.g., 700, associated with the first flexible-algorithm. Similarly, router 12B may be configured with a default node SID of 105 for the default segment route, which is offset to a node SID of 805 for the first flexible-algorithm. Router 12C may be configured with a default node SID of 109 for the default segment router, which is offset to a node SID of 809 for the first flexible-algorithm. Router 12D may be configured with a default node SID of 111 for the default segment route, which is offset to a node SID of 811 for the first flexible-algorithm.

Router 12E may be configured with a default node SID of 108 for the default segment route, which is offset to a node SID of 808 for the first flexible-algorithm.

Routers participating in the first flexible-algorithm may identify each other by node SIDs offset by 700. For example, routers 12B-12E may reach router 12A using the node SID of 803. Routers 12A, 12C-12E may reach router 12B using the node SID of 805, and so on. Although illustrated with an offset value of 700 corresponding to the first flexible-algorithm, the offset value may be any value that offsets the node SID of the default segment route to a value within the SRGB.

Similarly, a subset of routers 12 may be configured to participate in a different plane in network 4. For example, router 12F may be configured with a node SID of 104 for a default segment route (e.g., flexible-algorithm identifier of 0), which is offset by a SID offset associated with the second flexible-algorithm, e.g., 800. Similarly, router 12G may be configured with a default node SID of 106 for the default segment route, which is offset to a node SID of 906 for the second flexible-algorithm. Router 12H may be configured with a default node SID of 107 for the default segment route, which is offset to a node SID of 907 for the second flexible-algorithm. Router 12I may be configured with a default node SID of 112 for the default segment route, which is offset to a node SID of 912 for the second flexible-algorithm. Router 12E may be configured with a default node SID of 108 for the default segment route, which is offset to a node SID of 908 for the second flexible-algorithm. In this way, routers participating in the second flexible-algorithm may identify each other by node SIDs offset by 800.

For ease of illustration, the table provided below illustrates the node SIDs configured for the default segment route, segment route with first flexible-algorithm, and segment route with second flexible-algorithm.

| Prefix | Router | Node SID for flexible-algorithm of 0 (Default SPF) | Node SID for first flexible-algorithm (first plane) | Node SID for second flexible-algorithm (second plane) |
|---|---|---|---|---|
| 3.3.3.3 | 12A | 103 | 803 | |
| 4.4.4.4 | 12F | 104 | | 904 |
| 5.5.5.5 | 12B | 105 | 805 | |
| 6.6.6.6 | 12G | 106 | | 906 |
| 7.7.7.7 | 12H | 107 | | 907 |
| 8.8.8.8 | 12E | 108 | 808 | 908 |
| 9.9.9.9 | 12C | 109 | 809 | |
| 11.11.11.11 | 12D | 111 | 811 | |
| 12.12.12.12 | 12I | 112 | | 912 |

To participate in a particular flexible-algorithm, routers typically advertise routing packets that include a node SID for the default segment route, a node SID that identifies the flexible-algorithm for which the router is to participate in, and a combination of a calculation-type, metric-type, and a set of constraints. The combination is referred to herein as a "flexible-algorithm definition." For example, calculation-type may include Shortest Path First or other calculation of a path. The metric-type may include the type of metric used to compute the best paths along the constrained topology. The set of constraints may restrict paths to links with specific affinities or avoid links with specific affinities. Routers may also advertise a numeric identifier (referred to as "flexible-algorithm identifier"), having a value between 128 and 255, that is associated via provisioning with the flexible-algorithm definition. The flexible-algorithm identifier (e.g., number or numerical identifier) and the flexible-algorithm definition is collectively referred to herein as a particular flexible-algorithm.

In some examples, routers advertise the support for a flexible-algorithm as a node capability in IGP segment routing extensions. In some examples, each of the routers may advertise the flexible-algorithm definition (flexible-algorithm identifier) within a type, length, and values ("TLV") of an OSPF packet or a sub-TLV of an ISIS packet, e.g., a IGP message advertising router capabilities. Specifically, the flexible-algorithm identifier may be advertised in the SR Algorithm field in an IGP Router Capability message. Further examples of flexible-algorithm are described in P. Psenak, Ed., et al., "IGP Flexible Algorithm," draft-ietf-lsr-flex-algo-00.txt," May 15, 2018, the entire contents of which is incorporated herein by reference.

In some instances, a router may participate in a plurality of flexible-algorithms. In these instances, a user typically configures a node SID for each of the flexible-algorithms for which the router participates in, and advertise, for example, a TLV for each of the flexible-algorithms that the router participates in. This is operationally inefficient and may subject the router to errors such as node SID conflicts due to misconfiguration of node SIDs (e.g., duplicate node SIDs). For example, routers that participate in a plurality of flexible-algorithms may configure a respective TLV of an OSPF packet or a sub-TLV of an ISIS packet, each including a node SID for the default segment route, a node SID that identifies a first flexible-algorithm, and flexible-algorithm identifier. In these examples, each of the TLVs (or sub-TLVs) may be 8 bytes of information, which requires greater administrative overhead. Moreover, users may misconfigure node SIDs for the flexible-algorithm. For example, when users configure node SIDs for the flexible-algorithm, the node SIDs may be misconfigured (e.g., duplicate node SIDs), which may lead to conflicts among the misconfigured node SIDs. Further, each node is also required to generate a prefix SID for each flexible-algorithm that it is participating in, which is operationally inefficient.

In accordance with the techniques described herein, a router may advertise a SID offset that routers participating in the flexible-algorithm may use to configure a node SID for the flexible-algorithm. More specifically, routers participating in a flexible-algorithm may advertise a SID offset associated with a flexible-algorithm in a sub-TLV of a route advertisement.

As one example, routers 12A-12E may each be configured to participate in a specific flexible-algorithm, e.g., first flexible-algorithm of network 4. Instead of configuring and advertising a node SID for the first flexible-algorithm, any of routers 12A-12E may advertise a flexible-algorithm definition for the first flexible-algorithm, a flexible-algorithm identifier (e.g., 128) and a SID offset (e.g., 700) associated with the first flexible-algorithm. For example, router 12A may send a route advertisement including a flexible-algorithm definition for the first flexible-algorithm, a flexible-algorithm identifier of 128, and a SID offset of 700. When other routers configured to participate in the first-flexible algorithm (e.g., routers 12B-12E) receive the advertisement, routers 12B-12E may each offset its default node SID by 700 to derive a node SID for the first flexible-algorithm.

Alternatively, or additionally, routers 12E-12I may each be configured to participate in a second flexible-algorithm of network 4. Instead of configuring and advertising a node SID for the second flexible-algorithm, routers 12E-12I may each advertise a flexible-algorithm definition for the second flexible-algorithm, a flexible-algorithm identifier (e.g., 129) and a SID offset (e.g., 800) associated with the second flexible-algorithm. For example, router 12F may send a route advertisement including a flexible-algorithm definition for the second flexible-algorithm, a flexible-algorithm identifier of 129, and a SID offset of 800. When other routers configured to participate in the second-flexible algorithm (e.g., routers 12E-12I) receive the advertisement, routers 12E-12I may each offset its default node SID by 800 to derive a node SID for the second flexible-algorithm.

A router may use IGP to associate the derived node SIDs with a particular flexible-algorithm. In this way, an ingress router for a particular flexible-algorithm may generate a segment list of the derived node SIDs (e.g., the node SIDs that have been offset) such that routers may steer the packet along the constrained path based on a segment list that is applied to the packet as it is forwarded through the network. For example, ingress router 12A may generate a segment list with the node SIDs derived by routers 12B-12E such that these routers may steer a packet along the constrained path of the first-flexible algorithm. Similarly, ingress router 12F may generate a segment list with the node SIDs derived by routers 12E-12I such that these routers may steer a packet along the constrained path of the second-flexible algorithm.

As further described in FIG. 2 below, routers 12 may advertise a SID offset within a sub-TLV. In some examples, a router may advertise the SID offset within a sub-TLV of the TLV of the OSPF packet. In other examples, a router may advertise the SID offset within a sub-TLV of the sub-TLV of the ISIS packet. Additional information regarding sub-TLVs is described in P. Psenak, Ed., et al., "IGP Flexible Algorithm," draft-ietf-lsr-flex-algo-00.txt," May 15, 2018, incorporated above.

The techniques may provide one or more technical advantages. For example, by advertising a SID offset associated with a flexible-algorithm instead of advertising a node SID for each flexible-algorithm that the router participates in, the configuration required for the router to participate in a flexible-algorithm may be simplified. For example, a user can configure which routers are to participate in a specific flexible-algorithm without configuring the node SIDs that the routers use to participate in the flexible-algorithm. The routers instead advertise a SID offset associated with the flexible-algorithm that the routers configured to participate in the flexible-algorithm may derive the node SID, thereby reducing the amount of manual configuration required on all routers participating in the flexible-algorithm, which reduces the administrative overhead. Moreover, advertising the SID offset may avoid misconfiguration of node SIDs for the flexible-algorithm. For example, when users manually configure node SIDs for the flexible-algorithm, the node SIDs may be misconfigured, which may lead to conflicts among the misconfigured node SIDs. By advertising a SID offset, routers configured to participate in the flexible-algorithm may receive the SID offset and derive the node SID for the router to participate in the flexible-algorithm, thereby reducing the occurrence of misconfigured node SIDs. Moreover, by advertising a SID offset, each node is no longer required to generate a prefix SID for each flexible-algorithm that it is participating in.

Figure 2:
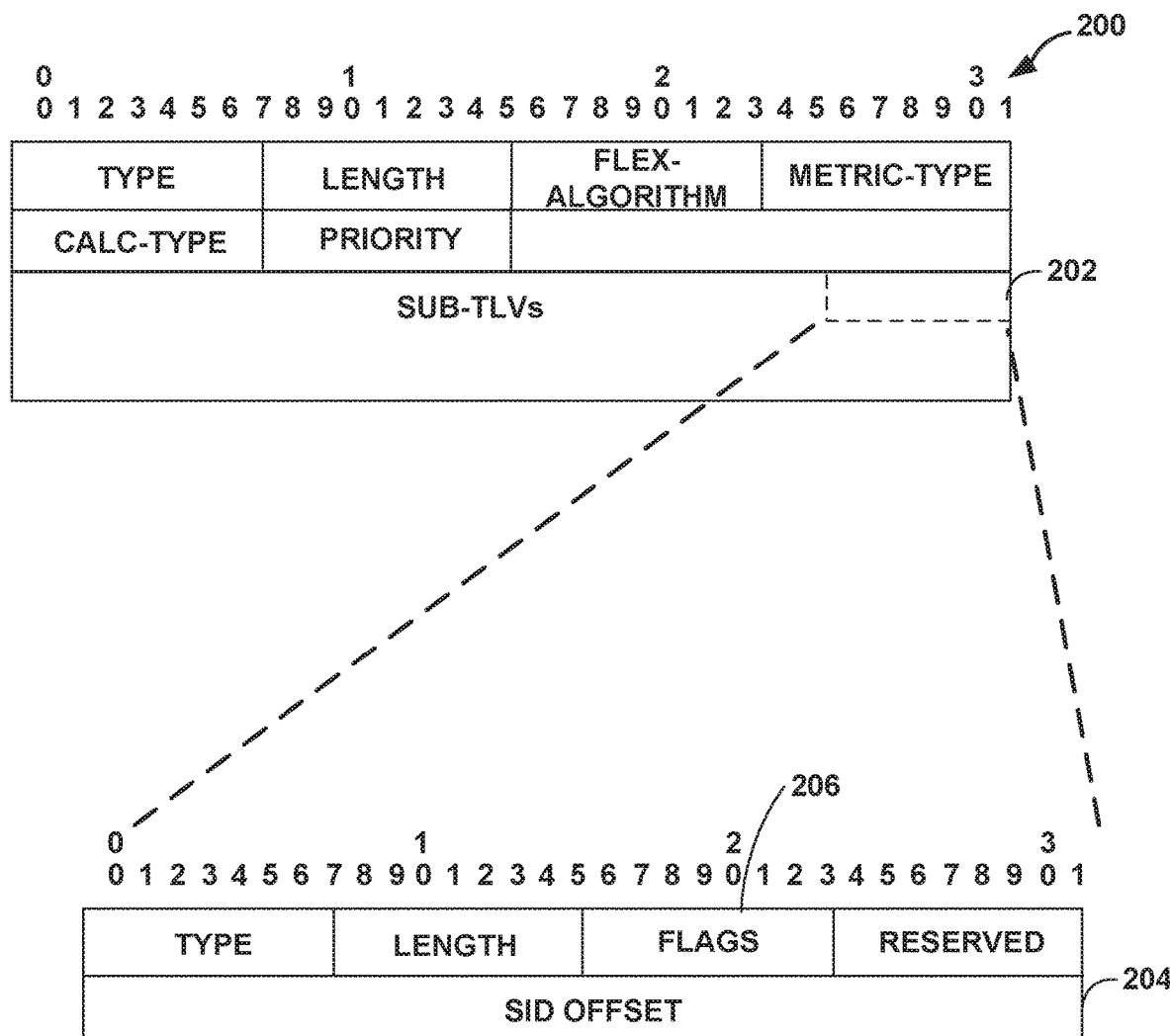
FIG. 2 illustrates an example Type/Length/Value (TLV) format for a packet sent to advertise a SID offset, in accordance with techniques described herein.

FIG. 2 illustrates an example Type/Length/Value (TLV) format for a packet sent to advertise a SID offset, in accordance with techniques described herein. For example, FIG. 2 illustrates an example TLV 200 of a route advertisement packet including a sub-Type/Length/Value (TLV) field 202 that includes a SID offset for a flexible-algorithm. In the example of FIG. 2, sub-TLV field 202 may represent a sub-TLV field 202 of a TLV 200 of an OSPF packet in accordance with A. Lindem, Ed., et al., "Extensions to OSPF for Advertising Optional Router Capabilities" RFC 7770, February 2016, the entire contents of which is incorporated by reference herein. Sub-TLV field 200 may alternatively represent a sub-TLV field 202 of a sub-TLV 200 of an ISIS packet in accordance with L. Ginsberg, et al., "IS-IS Extensions for Advertising Router Information" RFC 7981, October 2016, the entire contents of which is incorporated by reference herein. Further examples of the sub-TLV are described in P. Psenak, Ed., et al., "IGP Flexible Algorithm," draft-ietf-lsr-flex-algo-00.txt," incorporated above.

Sub-TLV field 202 may include, among other things, fields including: (1) a type field of sub-TLV 202, (2) a length field of sub-TLV 202, and (3) a SID offset field 204. In some examples, SID offset field 204 may be a 32-bit integer indicating an offset value with which other routers participating in the flexible-algorithm can derive node SIDs for the flexible-algorithm. For example, routers configured to participate in a first flexible-algorithm (e.g., routers 12A-12E of FIG. 1) may advertise a SID offset 204 having a value of 700 such that the routers configured to participate in the first flexible-algorithm may use SID offset 204 to derive node SIDs for the first flexible-algorithm by offsetting their default node SIDs by the offset value indicated in SID offset 204 (e.g., 700). Similarly, routers configured to participate in a second flexible-algorithm (e.g., routers 12E-12I of FIG. 1) may advertise a SID offset 204 having a value of 800 such that the routers configured to participate in the second flexible-algorithm may use SID offset 202 to derive node SIDs for the second flexible-algorithm by offsetting their default node SIDs by offset value indicated in the SID offset 204 (e.g., 800).

In some examples, sub-TLV field 200 may include a flag 206 to indicate various parameters. For example, flag 206 may indicate that the receiving router is to use the default node SIDs to participate in the flexible-algorithm. Flag 206 may alternatively, or additionally, indicate that the receiving router is to configure node SIDs in accordance with IPv4 (e.g., node SIDs as IPv4 prefixes) to participate in the flexible-algorithm. Flag 206 may alternatively, or additionally, indicate that the receiving router is to configure node SIDs in accordance with IPv6 (e.g., node SIDs as IPv6 prefixes) to participate in the flexible-algorithm. Flag 206 may alternatively, or additionally, indicate whether the SID offset is a negative value. In some examples, flag 206 may be used to instruct routers that are not configured to understand the sub-TLV field 202 to derive a node SID. As one example, flag 206 may be 8 bits having a most significant bit set. The routers configured to participate in the flexible-algorithm may derive a node SID only for IPv4 prefixes.

By including a SID offset 204 in a sub-TLV field 202, the configuration of a router to participate in the flexible-algorithm is simplified. For example, without the techniques described in this disclosure, a router may generate and advertise a node SID for each flexible-algorithm for which the router is participating in. Each TLV (or sub-TLV) for a particular flexible-algorithm may be 8 bytes of information. In examples where a router participates in a plurality of flexible-algorithms (e.g., router 12E), the router would advertise 8 bytes of information for each node SID configured for the plurality of flexible-algorithms. The techniques described herein may provide a sub-TLV field in which a SID offset is included in a 32-bit integer, thereby using less bytes.

Figure 3:
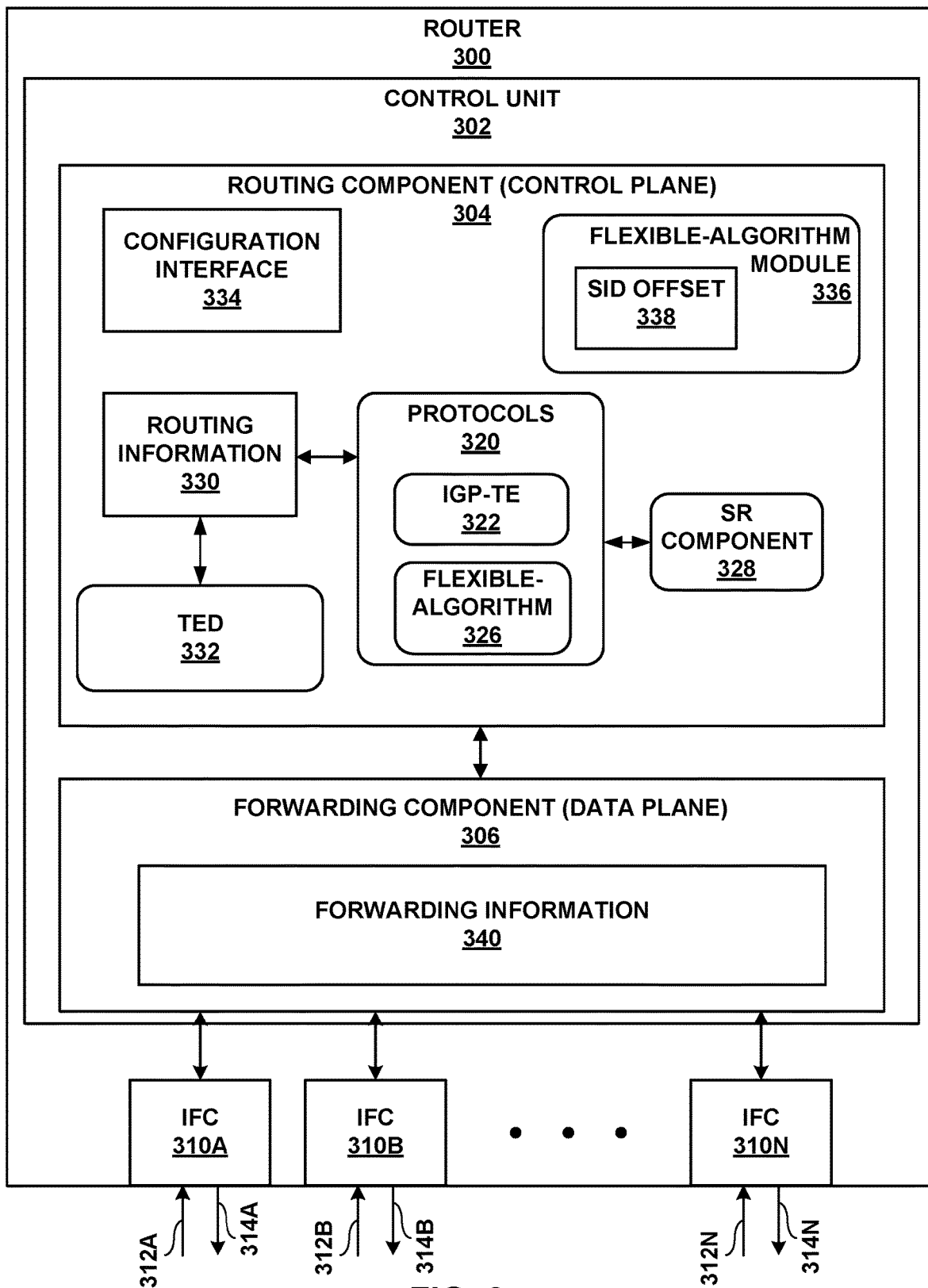
FIG. 3 is a block diagram illustrating an example router capable of operating in accordance with the techniques described herein.

FIG. 3 is a block diagram illustrating an example router 300 that performs various aspects of the techniques described in this disclosure. Router 300 may represent any of routers 12 of FIG. 1. While described with respect to router 300, the techniques may be implemented by any other type of network device capable of implementing at least routing protocols including a segment routing protocol. Thus, while described with respect to router 300, the techniques should not be limited to router 300 described with respect to the example of FIG. 3.

In the example of FIG. 3, router 300 includes interface cards 310A-310N ("IFCs 310") that receive and send data units, such as packet flows, via network links 312A-312N and 314A-314N, respectively. Router 300 may include a chassis (not shown) having a number of slots for receiving a set of cards, including IFCs 310. Each card may be inserted into a corresponding slot of the chassis for electrically coupling the card to routing component 306 via high-speed switch (not shown), which may comprise, for example, switch fabric, switchgear, a configurable network switch or hub, or other high-speed switching mechanisms. IFCs 310 may be coupled to network links 312A-312N and 314A-314N via a number of physical interface ports (not shown). Generally, IFCs 310 may each represent one or more network interfaces by which router 300 may interface with links of a network.

In general, router 300 may include a control unit 302 that determines routes of received packets and forwards the packets accordingly via IFCs 310. In the example of FIG. 3, control unit 302 includes routing component 304 (control plane) that configures and controls packet forwarding operations applied by packet forwarding component 306 (data plane).

Routing component 304 provides an operating environment for various routing protocols 320 that execute at different layers of a network stack. Routing component 304 is responsible for the maintenance of routing information 330 to reflect the current topology of a network and other network entities to which router 300 is connected. In particular, routing protocols periodically update routing information 330 to accurately reflect the topology of the network and other entities based on routing protocol messages received by router 300. The protocols may be software processes executing on one or more processors. For example, routing component 304 includes network protocols that operate at a network layer of the network stack, which are typically implemented as executable software instructions.

In the example of FIG. 3, protocols 320 may include IGP-TE 322 to implement an IGP protocol with traffic engineering extensions to exchange link state information, and facilitate forwarding of packets or other data units between endpoint devices. In some examples, IGP-TE component 322 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, Internet Draft for the Network Working Group, by A. Lindem et al., entitled "OSPFv3 LSA Extendibility," dated July 2013, draft-acee-ospfv3-1sa-extend-01.txt, and A Lindem, Ed., et al., "Extensions to OSPF for Advertising Optional Router Capabilities" RFC 7770, February 2016, each of which are incorporated by reference as if set forth in their respective entireties. In some examples, IGP-TE component 322 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP-TE component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety. IGP-TE component may also include extensions as described in L. Ginsberg, et al., "IS-IS Extensions for Advertising Router Information" RFC 7981, October 2016, the entire contents of which are incorporated by reference herein.

Routing component 304 includes a segment routing (SR) component 328 to implement segment routing techniques for IGP protocols (e.g., IS-IS and OSPF) for specifying how router 300 may advertise node SIDs or adjacency SIDs. As described in FIG. 1, these node SIDs or adjacency SIDs may steer a packet through a controlled set of instructions, called segments, by prepending the packet with a segment routing header.

Protocols 320 may also include flexible-algorithm protocol 324, such as examples in which the flexible-algorithm protocol 324 is implemented as an extension to the IGP-TE protocols 322. For example, flexible-algorithm protocol 326 may be in accordance with "draft-ietf-lsr-flex-algo-00.txt," as described above. For example, routing component 304 may execute flexible-algorithm protocol 324 to advertise flexible-algorithm advertisements to inform other routers in the network that router 300 is enabled for a flexible-algorithm path computation and/or receive flexible-algorithm advertisements to learn of other routers in the network that are enabled for the flexible-algorithm path computation.

By executing the routing protocols, routing component 304 identifies existing routes through the network and determines new routes through the network. Routing component 304 stores routing information 330 that includes, for example, known routes through the network. Forwarding component 306 stores forwarding information 334 that includes destinations of output links 314. Forwarding information 340 may be generated in accordance with routing information 330.

Routing component 304 may include a Traffic Engineering Database (TED) 332 for storing e.g., path information for segment routed LSPs. In some examples in which router 300 supports segment routing (e.g., SPRING), TED 332 may include segment identifier information. In some examples, TED 332 may also include flexible-algorithm information 334 that includes the node SIDs of routers enabled for a flexible-algorithm path computation and the associated flexible-algorithm identifier and flexible-algorithm definition. TED 332 may be in the form of a variety of data structures, such as a number of tables, link lists, radix trees, databases, flat files, or other data structures.

Routing component 304 also includes a configuration interface 334 that receives and may report configuration data for router 300. Configuration interface 334 may represent a command line interface; a graphical user interface; Simple Network Management Protocol (SNMP), Netconf, or another configuration protocol; or some combination of the above in some examples. Configuration interface 334 receives configuration data configuring router 300, such as configuring whether router 300 is to participate in a flexible-algorithm. Router 300 may store configuration data to a storage device (not shown in FIG. 3).

In accordance with the techniques described in this disclosure, router 300 may advertise a SID offset that routers participating in the flexible-algorithm may each use to derive a node SID for the flexible-algorithm. In the example of FIG. 3, router 300 may include a flexible-algorithm module 336 to generate an advertisement including a SID offset 338. More specifically, flexible-algorithm module 336 may generate a sub-TLV field in accordance with flexible-algorithm protocol 326 that includes a SID offset 338 that routers participating in the flexible-algorithm, including router 300, may each use to derive a node SID for the flexible-algorithm. In an example in which IGP-TE component 322 includes OSPF, flexible-algorithm module 336 may generate a sub-TLV of a TLV of an OSPF packet to include the SID offset 338. In other examples in which IGP-TE component 322 includes ISIS, flexible-algorithm module 336 may generate a sub-TLV of a sub-TLV of an ISIS packet to include the SID offset 338.

For example, a user may use configuration interface 334 to set a value for SID offset 338. For example, a user may set a SID offset 338 with a value of 700 for a first flexible-algorithm and/or a value of 800 for a second flexible-algorithm. Flexible-algorithm module 336 of router 300 may use the IGP-TE component 322 to generate an OSPF packet (in accordance with RFC 7770). Flexible-algorithm module 336 may generate a sub-TLV of the OSPF packet to include the SID offset 338. Alternatively, or additionally, flexible-algorithm 334 of router 300 may use the IGP-TE component 322 to generate an ISIS packet (in accordance with RFC 7981). Flexible-algorithm module 336 may generate a sub-TLV of the ISIS packet to include the SID offset 338. Router 300 may advertise the packet to other routers in the network.

In an example where router 300 is a router configured to participate in the flexible-algorithm and receives a packet including SID offset 338 within a sub-TLV, flexible-algorithm module 336 may derive a node SID for the flexible-algorithm using the SID offset 338 in the packet. For example, router 300 may offset a default node SID of router 300 by the offset value indicated in SID offset 338. The derived node SID for the flexible-algorithm is stored in TED 332.

In this way, when router 300 is configured to participate in a flexible-algorithm, flexible-algorithm module 336 may generate, for example, a sub-TLV to include a SID offset 338 that is advertised to other routers. Alternatively, or additionally, if router 300 is configured to participate in a flexible-algorithm, flexible-algorithm module 336 may, in response to receiving a route advertisement with a sub-TLV including a SID offset 338 for the flexible-algorithm, derive a node SID for router 300 to participate in the flexible-algorithm.

Although described for purposes of example with respect to a router, router 300 may be more generally a network device having routing functionality, and need not necessarily be a dedicated routing device. The architecture of router 300 illustrated in FIG. 3 is shown for example purposes only. The techniques of this disclosure are not limited to this architecture. In other examples, router 300 may be configured in a variety of ways. In one example, some of the functionally of control unit 302 may be distributed within IFCs 310. In another example, control unit 302 may comprise a plurality of packet forwarding engines operated as slave routers.

Control unit 302 may be implemented solely in software, or hardware, or may be implemented as a combination of software, hardware, or firmware. For example, control unit 302 may include one or more processors that execute program code in the form of software instructions. In that case, the various software components/modules of control unit 302 may comprise executable instructions stored on a computer-readable storage medium, such as computer memory or hard disk.

Figure 4:
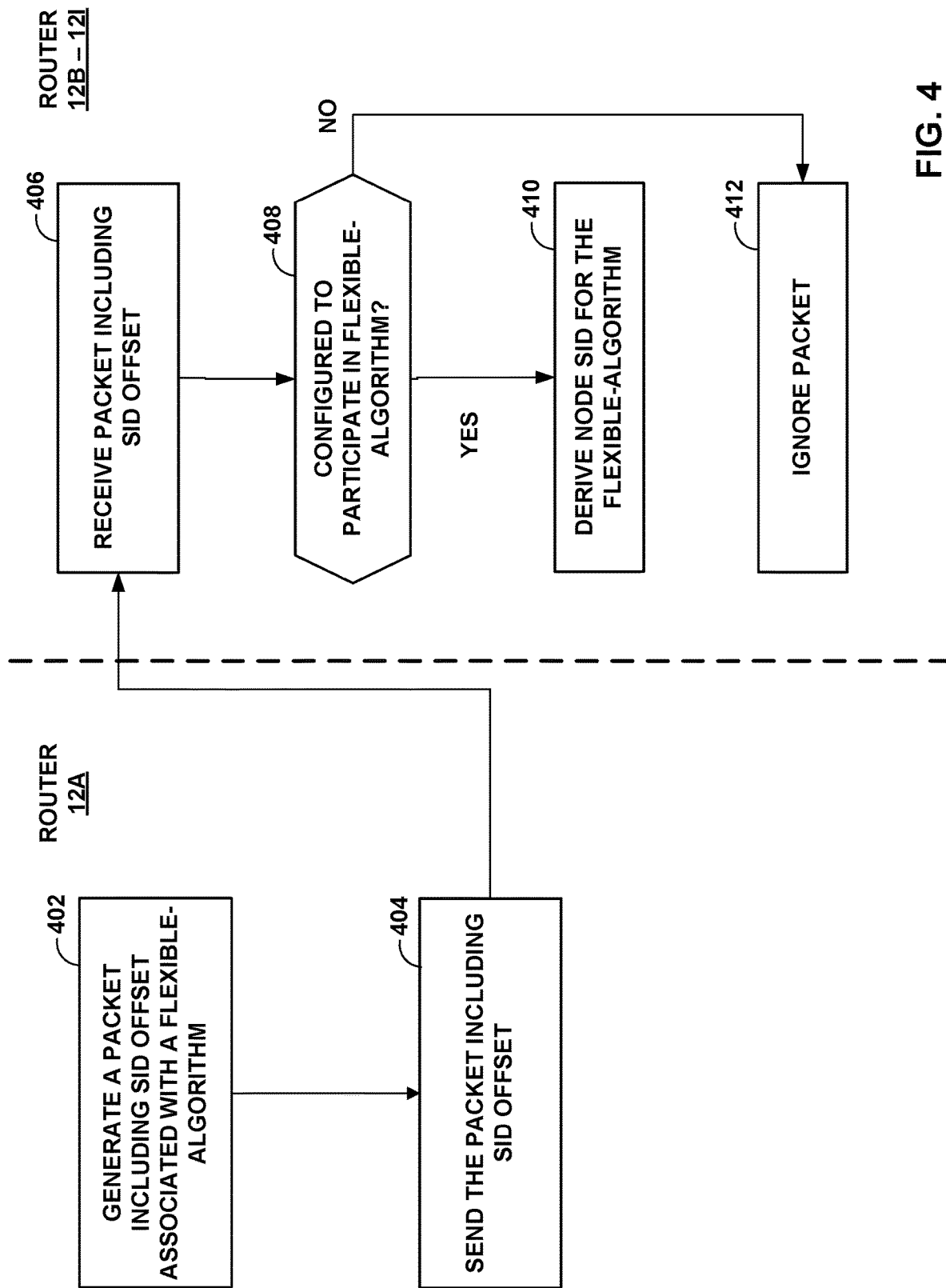
FIG. 4 is a flowchart illustrating an example operation of a router capable of operating in accordance with the techniques described herein.

FIG. 4 is a flowchart illustrating an example operation of a router capable of operating in accordance with the techniques described herein. FIG. 4 will be explained with reference to routers 12 of FIG. 1 and router 300 of FIG. 3.

In the example of FIG. 4, router 12A may generate a packet including a SID offset associated with a flexible-algorithm that router 12A is to participate in. For example, flexible-algorithm module 336 of router 12A may use the IGP-TE component 322 to generate an OSPF packet (in accordance with RFC 7770) including the flexible-algorithm definition and a flexible-algorithm identifier. Flexible-algorithm module 336 may generate a sub-TLV of the OSPF packet to include the SID offset 338.

Alternatively, or additionally, flexible-algorithm 334 of router 300 may use the IGP-TE component 322 to generate an ISIS packet (in accordance with RFC 7981) including the flexible-algorithm definition and a flexible-algorithm identifier. Flexible-algorithm module 336 may generate a sub-TLV of the ISIS packet to include the SID offset 338.

In some examples, the sub-TLV specifying the SID offset may also include one or more flags. In some examples, the sub-TLV may include a flag to indicate various parameters. For example, flag may indicate that receiving routers configured to participate in the flexible-algorithm are to use default node SIDs to participate in the flexible-algorithm. The flag may alternatively, or additionally, indicate that receiving routers configured to participate in the flexible-algorithm are to configure node SIDs in accordance with IPv4 (e.g., node SIDs as IPv4 prefixes) to participate in the flexible-algorithm. The flag may alternatively, or additionally, indicate that receiving routers configured to participate in the flexible-algorithm are to configure node SIDs in accordance with IPv6 (e.g., node SIDs as IPv6 prefixes) to participate in the flexible-algorithm. The flag may alternatively, or additionally, indicate whether the SID offset is a negative value. The flag may alternatively, or additionally, instruct routers that are not configured to understand the sub-TLV as described in this disclosure to derive a node SID.

Router 12A may send the packet including the SID offset to the other routers of the network (404). A router, e.g., router 12B, within the network may receive the packet including the SID offset (406) and may determine whether the router is configured to participate in the flexible-algorithm (408).

If the router determines that it does not participate in the flexible-algorithm ("NO" branch of step 408), the router may ignore the packet (412). Alternatively, if the router determines that it is configured to participate in the flexible-algorithm ("YES" branch of step 408), the router may derive a node segment identifier for the flexible-algorithm. For example, the router may use the SID offset associated with the flexible-algorithm to derive a node segment identifier that is offset based on the SID offset. As one example, router 12A may advertise a SID offset of 700 associated with a first flexible-algorithm (e.g., flexible-algorithm identifier of 128), router 12B, in response to determining that it is configured to participate in the flexible-algorithm, may derive a node SID for router 12B by offsetting its default node SID by 700.

In some examples, the router may determine if the sub-TLV specifying the SID offset also includes one or more flags. In some examples, if the sub-TLV includes a flag to indicate that default node SIDs are used to participate in the flexible-algorithm, the router may use the default node SID for the flexible-algorithm. In some examples, if the sub-TLV includes a flag to indicate that node SIDs are to be configured in accordance with IPv4 to participate in the flexible-algorithm, the router may generate a node SID configured in accordance with IPv4. In some examples, if the sub-TLV includes a flag to indicate that default node SIDs are to be configured in accordance with IPv6 to participate in the flexible-algorithm, the router may generate a node SID in accordance with IPv6. In some examples, if a router receiving the sub-TLV may not be configured to understand the sub-TLV, the router may determine based on a value of a flag to generate the node SID for the flexible-algorithm.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

What is claimed is:

1. A method comprising:
   generating, by a network device of a plurality of network devices enabled for flexible-algorithm to compute one or more constraint based paths, a segment identifier (SID) offset, wherein the SID offset is a single offset value associated with a particular constraint-based path computed from the flexible-algorithm; and
   sending, by the network device and to each of the plurality of network devices other than the network device, a respective packet including the SID offset to enable the plurality of network devices to each derive a respective node segment identifier, by using the SID offset to offset a default node segment identifier of a given network device of the plurality of network devices for a default segment route, for the given network device to steer traffic along the particular constraint based path computed from the flexible-algorithm.

2. The method of claim 1,
   wherein the packet comprises an Intermediate System—Intermediate System (ISIS) packet, and
   wherein the SID offset is included in a sub-type, length, and value (sub-TLV) of the ISIS packet.

3. The method of claim 1,
   wherein the packet comprises an Open Shortest Path First (OSPF) packet, and
   wherein the SID offset is included in a sub-type, length, and value (sub-TLV) of the OSPF packet.

4. The method of claim 1, wherein the packet further comprises a flag to indicate to the given network device to use the default node segment identifier to steer traffic along the particular constraint based path computed from the flexible-algorithm.

5. The method of claim 1, wherein the packet further comprises a flag to indicate to the given network device to generate the node segment identifier in accordance with Internet Protocol version 4 (IPv4) to steer traffic along the particular constraint based path computed from the flexible-algorithm.

6. The method of claim 1, wherein the packet further comprises a flag to indicate to the given network device to generate the node segment identifier in accordance with Internet Protocol version 6 (IPv6) to steer traffic along the particular constraint based path computed from the flexible-algorithm.

7. The method of claim 1, wherein the packet further comprises a flag to indicate whether the SID offset is a negative value.

8. The method of claim 1,
   wherein the packet specifies a flexible-algorithm segment definition and the SID offset,
   wherein the flexible-algorithm segment definition is associated with a set of constraints on the flexible-algorithm, an identification of a calculation-type, and an identification of a metric-type.

9. A method comprising:
   receiving, by a network device of a plurality of network devices enabled for a flexible-algorithm to compute one or more constraint based paths, a packet including a segment identifier (SID) offset for the flexible-algorithm, wherein the SID offset is an offset value associated with a particular constraint-based path computed from the flexible-algorithm;

determining, by the network device, whether the network device is configured to steer traffic along the particular constraint-based path computed from the flexible-algorithm; and deriving, by the network device and by using the SID offset to offset a default node segment identifier of the network device for a default segment route, a node segment identifier that enables the network device to steer traffic along the particular constraint-based path computed from the flexible-algorithm.

10. The method of claim 9,
wherein the packet comprises an Intermediate System—Intermediate System (ISIS) packet, and
wherein the SID offset is included in a sub-type, length, and value (sub-TLV) of the ISIS packet.

11. The method of claim 9,
wherein the packet comprises an Open Shortest Path First (OSPF) packet, and
wherein the SID offset is included in a sub-type, length, and value (sub-TLV) of the OSPF packet.

12. The method of claim 9, wherein the packet further comprises a flag to indicate to the given network device to use the default node segment identifier to steer traffic along the particular constraint based path computed from the flexible-algorithm.

13. The method of claim 9, wherein the packet further comprises a flag to indicate to the given network device to generate the node segment identifier in accordance with Internet Protocol version 4 (IPv4) to steer traffic along the particular constraint based path computed from the flexible-algorithm, wherein deriving the node segment identifiers to steer traffic along the particular constraint based path computed from the flexible-algorithm further comprises:

generating, in response to receiving the packet comprising the flag, a node segment identifier in accordance with Internet Protocol version 4 (IPv4) to steer traffic along the particular constraint based path computed from the flexible-algorithm.

14. The method of claim 9, wherein the packet further comprises a flag to indicate to the given network device to generate the node segment identifier in accordance with Internet Protocol version 6 (IPv6) to steer traffic along the particular constraint based path computed from the flexible-algorithm, wherein deriving the node segment identifiers to steer traffic along the particular constraint based path computed from the flexible-algorithm further comprises:

generating, in response to receiving the packet comprising the flag, a node segment identifier in accordance with Internet Protocol version 6 (IPv6) to steer traffic along the particular constraint based path computed from the flexible-algorithm.

15. The method of claim 9, wherein the packet further comprises a flag to indicate whether the SID offset is negative value.

16. A network device of a plurality of network devices enabled for flexible-algorithm to compute one or more constraint based paths, comprising:

a memory;
one or more programmable processors operably coupled to the memory, wherein the one or more programmable processors are configured to:
generate a segment identifier (SID) offset, wherein the SID offset is a single offset value associated with a particular constraint-based path computed from the flexible-algorithm; and
send, to each of the plurality of network devices, a respective packet including the SID offset to enable the the plurality of network devices to each derive a respective node segment identifier, by using the SID offset to offset a default node segment identifier of a given network device of the plurality of network devices for a default segment route, for the given network device to steer traffic along the particular constraint-based path computed from the flexible-algorithm.

17. The network device of claim 16,
wherein the packet comprises an Intermediate System—Intermediate System (ISIS) packet, and
wherein the SID offset is included in a sub-type, length, and value (sub-TLV) of the ISIS packet.

18. The network device of claim 16,
wherein the packet comprises an Open Shortest Path First (OSPF) packet, and
wherein the SID offset is included in a sub-type, length, and value (sub-TLV) of the OSPF packet.

19. The network device of claim 16,
wherein the packet specifies a flexible-algorithm segment definition and the SID offset,
wherein the flexible-algorithm segment definition is associated with a set of constraints on the flexible-algorithm, an identification of a calculation-type, and an identification of a metric-type.

* * * * *